(12) United States Patent
Bharti et al.

(10) Patent No.: US 12,072,786 B2
(45) Date of Patent: Aug. 27, 2024

(54) DYNAMIC DEBUG TRACING WITH MACHINE LEARNING

(71) Applicant: International Business Machines Corporation, Armonk, NY (US)

(72) Inventors: Harish Bharti, Pune (IN); Ingo Averdunk, Markt Schwaben (DE); Shankar Sundaram Kalyana, Austin, TX (US); Rajesh Kumar Saxena, Maharashtra (IN); Rajib Das, Kolkata (IN)

(*) Notice: Subject to any disclaimer, the term of this patent is extended or adjusted under 35 U.S.C. 154(b) by 126 days.

(21) Appl. No.: 17/647,088

(22) Filed: Jan. 5, 2022

(65) Prior Publication Data

US 2023/0214311 A1 Jul. 6, 2023

(51) Int. Cl.
G06F 9/44 (2018.01)
G06F 11/07 (2006.01)
G06F 11/34 (2006.01)
G06F 11/36 (2006.01)

(52) U.S. Cl.
CPC ...... G06F 11/3664 (2013.01); G06F 11/0772 (2013.01); G06F 11/3409 (2013.01); G06F 11/3636 (2013.01)

(58) Field of Classification Search
CPC ............. G06F 11/3664; G06F 11/0772; G06F 11/3409; G06F 11/3636
See application file for complete search history.

(56) References Cited

U.S. PATENT DOCUMENTS

| 9,075,912 B2 | 7/2015 | Rhee et al. |
| 9,568,547 B2 | 2/2017 | Menon et al. |
| 2008/0307267 A1* | 12/2008 | Chandrasekaran ........... G06F 11/3688 714/38.11 |
| 2010/0125470 A1* | 5/2010 | Chisholm .............. G06Q 20/40 705/35 |
| 2010/0281488 A1* | 11/2010 | Krishnamurthy ... G06F 11/3664 715/771 |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Hang Pan
(74) *Attorney, Agent, or Firm* — Elliot J. Shine, Esq.; Rachel L. Pearlman, Esq.; Heslin Rothenberg Farley and Mesiti P.C.

(57) ABSTRACT

A method, computer program product, and system include a processor(s) that obtains a request for a transaction to be processed by an application in a computing system. The processor(s) applies, to the request for the transaction, an outlier detection model, to determine whether the transaction comprises attributes matching transaction tuples of one or more historical transactions identified as triggering issues in the computing system when the application processed the historical transactions. The processor(s) classifies the transaction as being an outlier transaction or as being a standard transaction, based on applying the outlier detection model. Based on determining that the transaction is an outlier transaction, concurrently with the application processing the transaction, the processor(s) turn on the debug trace to debug trace the application processing of the transaction.

16 Claims, 8 Drawing Sheets

(56) References Cited

U.S. PATENT DOCUMENTS

| | | | |
|---|---|---|---|
| 2011/0131295 A1* | 6/2011 | Jolfaei | G06F 11/366 709/219 |
| 2012/0304008 A1* | 11/2012 | Hackstein | G05B 23/024 714/E11.178 |
| 2019/0042391 A1 | 2/2019 | Menon et al. | |
| 2019/0370147 A1 | 12/2019 | Ravindranath Sivalingam et al. | |
| 2021/0117308 A1* | 4/2021 | Burgos | G06F 11/3624 |
| 2021/0357309 A1* | 11/2021 | Blouvshtein | G06F 11/3089 |
| 2022/0327504 A1* | 10/2022 | Koren | G06Q 20/08 |

* cited by examiner

DYNAMIC DEBUG TRACING WITH MACHINE LEARNING

BACKGROUND

When software is being tested in development or in quality assurance environments, which are separate from production environments to which this software can be eventually deployed, specialized logging referred to as tracing is utilized to provide developers and testers with an enhanced view of the functionality of the software. Tracing involves a specialized use of logging to record information about a program's execution. This information is typically used by programmers for debugging purposes, and additionally, depending on the type and detail of information contained in a trace log, by experienced system administrators or technical-support personnel and by software monitoring tools, to diagnose common problems with the software.

Tracing, also referred to as "debug tracing," is generally not utilized in production environments. The complexity of tracing can adversely impact efficiencies of a production environment and the data provided by the tracing can be difficult to scale to provide useful feedback where the software is accessed by multiple users and not just developers (in development environments) and testers (in quality assurance environments). For at least these reasons, tracing is generally not utilized in production environments.

When a debug trace is turned off, understanding the issue that results in an error can be difficult as the data in the error log can be insufficient to understand the error and recreating the issue can take significant time with a different test user and different data.

SUMMARY

Shortcomings of the prior art are overcome, and additional advantages are provided through the provision of a method for dynamically utilizing debug tracing in a production environment. The method includes, for instance: obtaining, by one or more processors, via a gateway, a request for a transaction to be processed in the computing system by an application executing on one or more computing resources of the computing system, where a debug trace for transactions processed by the computing system is turned off by default. The method also includes applying, by the one or more processors, to the request for the transaction, an outlier detection model, to determine whether the transaction comprises attributes matching transaction tuples of one or more historical transactions identified as triggering issues in the computing system when the application processed the historical transactions. The method also includes classifying, by the one or more processors, the transaction as being an outlier transaction or as being a standard transaction, based on applying the outlier detection model. The method also includes based on determining that the transaction is an outlier transaction, concurrently with the application processing the transaction, turning on the debug trace to debug trace the application processing of the transaction.

Shortcomings of the prior art are overcome, and additional advantages are provided through the provision of a computer program product for dynamically utilizing debug tracing in a production environment. The computer program product comprises a storage medium readable by a one or more processors and storing instructions for execution by the one or more processors for performing a method. The method includes, for instance: obtaining, by the one or more processors, via a gateway, a request for a transaction to be processed in the computing system by an application executing on one or more computing resources of the computing system, where a debug trace for transactions processed by the computing system is turned off by default. The method also includes applying, by the one or more processors, to the request for the transaction, an outlier detection model, to determine whether the transaction comprises attributes matching transaction tuples of one or more historical transactions identified as triggering issues in the computing system when the application processed the historical transactions. The method also includes classifying, by the one or more processors, the transaction as being an outlier transaction or as being a standard transaction, based on applying the outlier detection model. The method also includes based on determining that the transaction is an outlier transaction, concurrently with the application processing the transaction, turning on the debug trace to debug trace the application processing of the transaction.

Shortcomings of the prior art are overcome, and additional advantages are provided through the provision of a system for dynamically utilizing debug tracing in a production environment. The system includes: a memory, one or more processors in communication with the memory, and program instructions executable by the one or more processors via the memory to perform a method. The method includes, for instance: obtaining, by the one or more processors, via a gateway, a request for a transaction to be processed in the computing system by an application executing on one or more computing resources of the computing system, where a debug trace for transactions processed by the computing system is turned off by default. The method also includes applying, by the one or more processors, to the request for the transaction, an outlier detection model, to determine whether the transaction comprises attributes matching transaction tuples of one or more historical transactions identified as triggering issues in the computing system when the application processed the historical transactions. The method also includes classifying, by the one or more processors, the transaction as being an outlier transaction or as being a standard transaction, based on applying the outlier detection model. The method also includes based on determining that the transaction is an outlier transaction, concurrently with the application processing the transaction, turning on the debug trace to debug trace the application processing of the transaction.

Methods, computer program products, and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
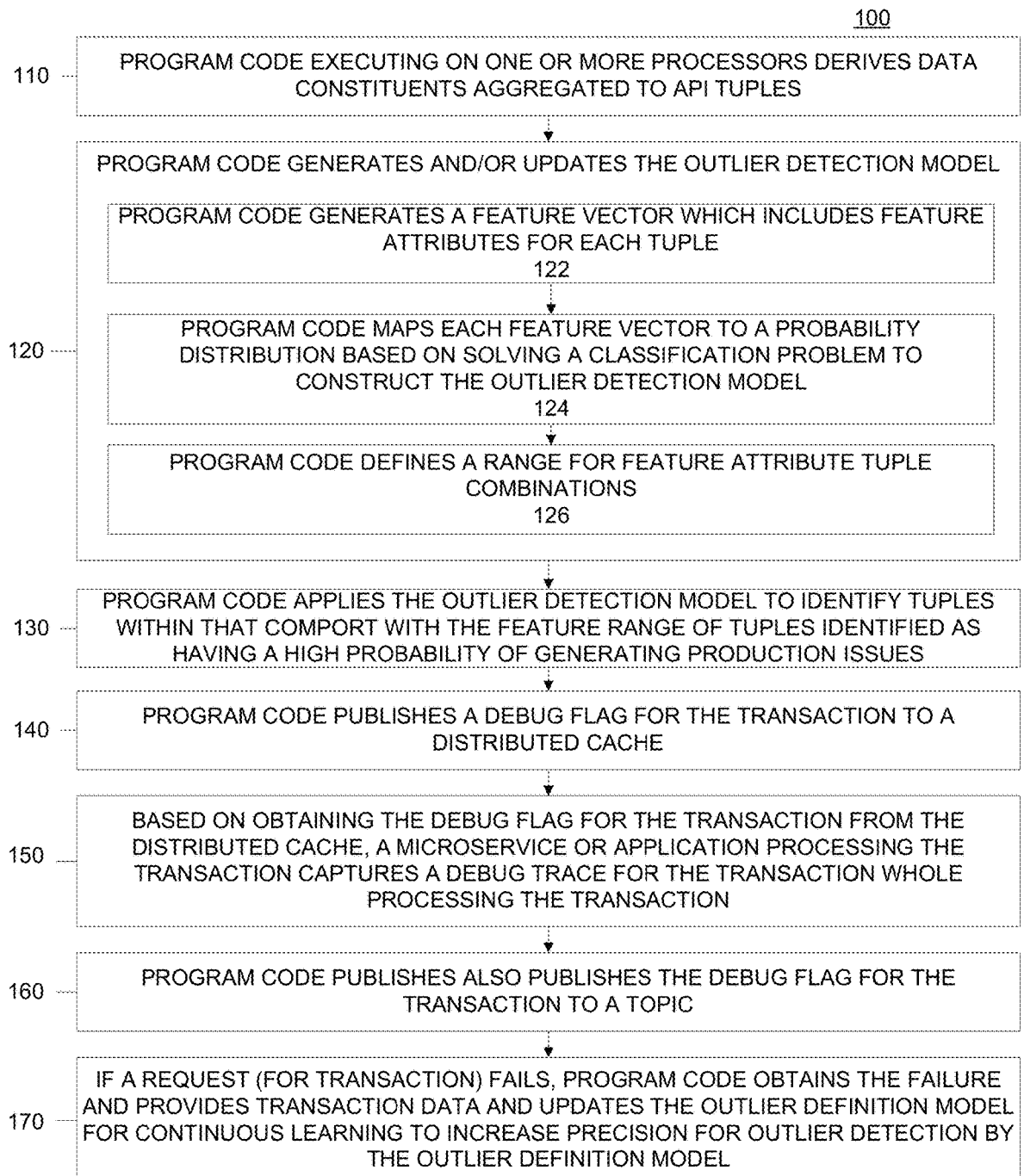
FIG. 1 depicts a workflow that includes various aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
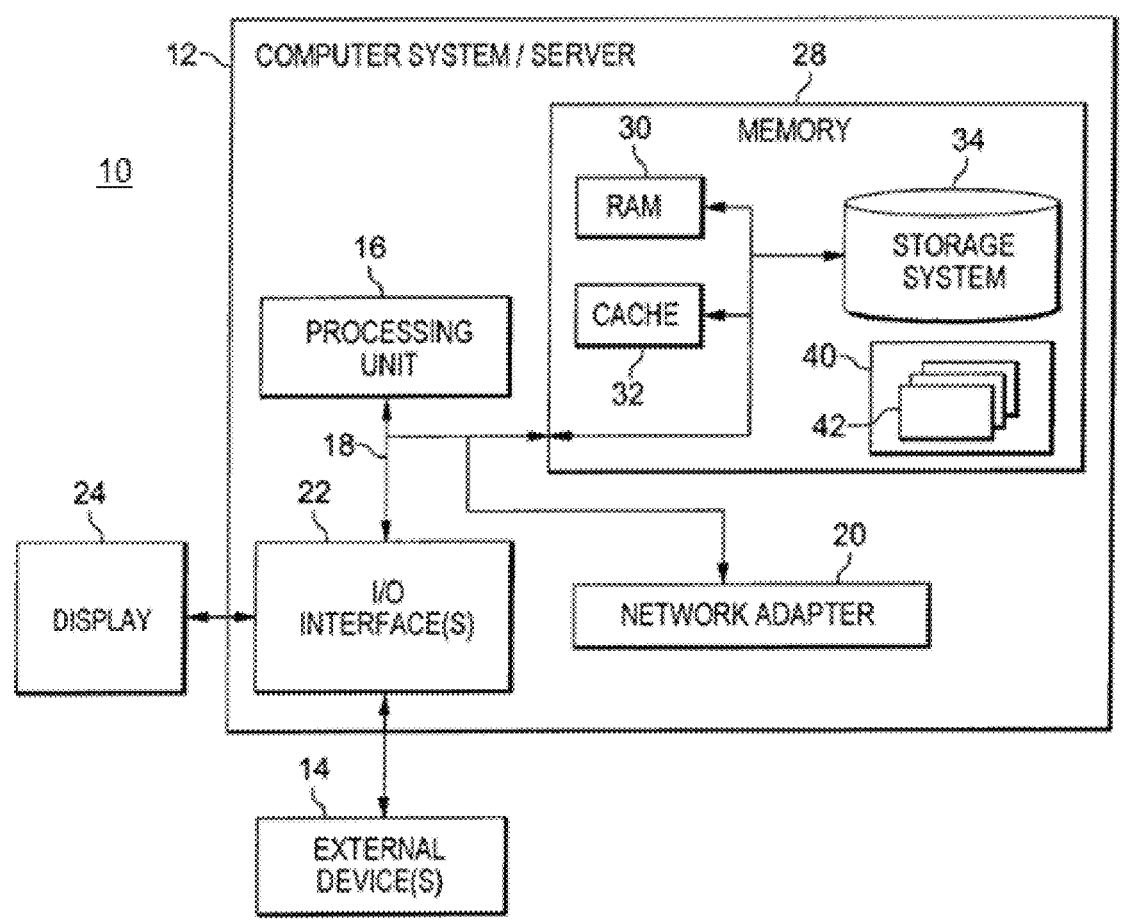
FIG. 6 depicts on embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, may be stored in memory 28.

Debug tracing provides insights into production issues in computing systems that are not available without this specific type of logging. When a debug trace is turned off, understanding the issue that results in an error can be difficult as the data in the error log can be insufficient to understand the error and recreating the issue can take significant time with a different test user and different data. However, utilizing debug tracing can negatively impact system productivity. Tracing all transactions would result in poor performance attributed to high input/output (IO) operations. Capturing traces for all transactions in memory is extremely expensive for enterprise systems utilized by digital organization, including by limited to those performing ~10K throughputs per second or higher. Additionally, the number of transactions in a production environment can generate an abundance of logs, making the logs with utility difficult to isolate. Selectively capturing traces after certain events does not address these shortcomings because although the occurrences after these events would be captured, the issues that created the events would not and thus, reoccurrence would be difficult to prevent.

In embodiments of the present invention, program code executing on one or more processors generates, updates, and applies an outlier definition model to determine whether transactions have a high probability of causing issues and if the outlier definition model indicates this high probability, the program code dynamically turns on debug tracing such that should the anticipated/predicted issue arise, the debug tracing will have occurred so logs to diagnose and comprehend the issue will be available. Embodiments of the present invention provide a framework for managing dynamic tracing by utilizing machine learning to detect transaction outliers. As discussed below, program code in embodiments of the present invention generates and continuously updates a model (i.e., an outlier definition model) to recognize transaction tuples with a high probability of resulting in functional and/or technical errors. A tuple is a data structure (i.e., a mechanism for grouping and organizing data to make it easier for program code or other programmatical objects to utilize). Generally, a tuple can be used to group any number of items into a single compound value. In this context, a transactions tuple is a finite group of transactions that an application and/or microservice is to process. In the examples herein, the program code learns to recognize and recognizes these groups (i.e., transaction tuples), which present a high probability of creating an issue for applications and/or microservices processing the transactions in the computing environment executing the application and/or microservice. To generate and update the outlier definition mode, program code in various embodiments of the present invention, executing on one or more processing resource: 1) derives data constituents aggregated to application programming interface (API) tuples; 2) generates a feature vector which includes feature attributes for each tuple; 3) maps each feature vector to a probability distribution based on solving a classification problem in order to construct a model (an outlier detection model); and/or 4) defines a range for feature attribute tuple combinations. Thus, the program code generates, updates, and applies an outlier detection model to determine whether to dynamically engage tracing. Thus, when the program code determines that there is a probability that an issue will occur, should that prediction come to fruition, debug tracing will have occurred and the log files to recreate and understand the event will have been generated.

Embodiments of the present invention are inextricably linked to computing and provide a practical application. Anticipating, diagnosing, and preventing failure in computing systems are tasks unique to computing systems. Debug tracing continuously in production environments, as aforementioned, inefficiently utilizes computing resources and creates overhead issues. Additionally, because of the number of users interacting with, for example, a given application at one time in a production environment, if an issue occurs with this application, the amount of trace logs produced at that time would make locating the specific issue difficult and time-consuming (if possible, at all). Thus, embodiments of the present invention are not only inextricably tied to computing, but they also improve the functionality or computing environments into which they are implemented. As explained below, in examples herein, trace logging is automatically engaged by the program code when the program code predicts, within a certain pre-defined threshold, that one or more requested transactions, when processed by the application, will create an issue. Thus, should the application processing one or more requested transactions generate an issue, error, and/or a failure, the trace logs will be available to diagnose the issue. Aspects of embodiments of the present invention provide a significant advantage over existing approaches to error logging at least because they provide detailed information sufficient to improve applications in production environments without adversely impacting efficiencies within the production environments.

Figure 4:
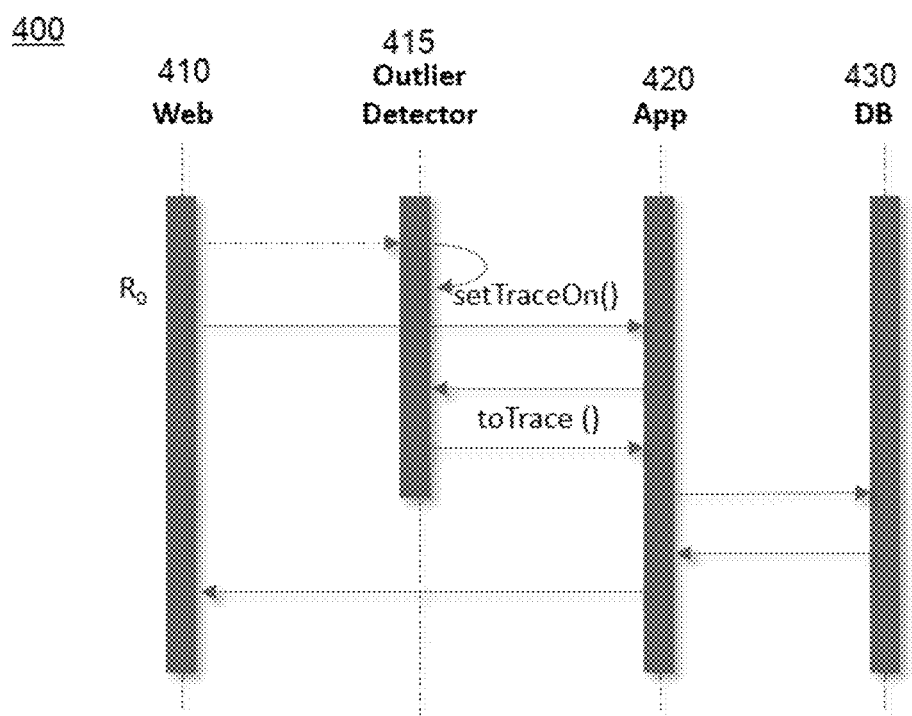
FIG. 4 depicts an example of aspects of embodiments of the present invention dynamically engaging debug tracing.

FIG. 1 is a workflow 100 that provides an overview of certain aspects of some embodiments of the present invention. As illustrated in FIG. 1, the program code identifies transactions that are potentially problematic when they are requested and thus, before they are processed by an application and/or microservice in a computing environment. Thus, the program code engages debug tracing for the transaction such that the debug tracing is active when an application and/or microservice in the computing environment processes the transaction. In embodiments of the present invention, program code executing on one or more processors derives data constituents aggregated to API tuples (110). The program code obtains transactions because when a request for a given transaction is received, via an API gateway, the request is asynchronously published as it continues to adaptors of the gateway. In some examples, the API gateway is a backend for frontend (BFF) layer and the adaptors are BFF adaptors. The meta data of the request includes a global transaction identifier, which is introduced by the API gateway. Publication of the request makes it available to the outlier detection model (generated and continuously updated by the program code). As understood by one of skill in the art, a BFF layer, which some consider a type of API gateway, is an orchestrator layer that includes aggregation, computation, and composition of some data. Thus, it provides functionality related to requests for transactions that is more complex than some API gateways. As a variant of an API gateway, a BFF provides an additional layer between microservices and clients. A BFF introduces multiple gateways for each client and is flexible enough to operate in a computing environment that includes microservices. An example of a technical architecture in which aspects of some embodiments of the present invention operate can include microservices. A BFF server is a server that serves a client application. Web applications utilize BFFs (as seen in FIG. 4). BFFs enable the intelligent batching of calls to other backends and return data all at once or transformed into a more convenient representation.

A microservice architecture is a method of developing software systems that enables support for a range of platforms and devices, including but not limited to, web-enables devices, mobile devices, Internet of Things (IoT) devices, and wearables. Because of this cross-platform and cross-device flexibility, this architecture is often utilized in shared computing systems and distributed systems, including in cloud computing systems. Presently, microservices are seeing increased use in cloud computing environments. A microservice architecture provides a method for developing software applications as suites of independently deployable, small, modular services, in which each service runs a unique process and communicates through a well-defined, lightweight, mechanism to serve a defined goal. Thus, a microservice architecture can be utilized to deploy multiple services that work together as a unique application. In this architecture, the overall versioning is represented by the sum of the single service code version. The multiplicity of the services provides a cohesive software solution across devices and platforms. For purposes of this document, a "microservice" is defined as set of code that includes instructions and data for performing a computational function (called a "service") in a manner so that: (i) the microservice can be used with other microservices to make applications in the form of collections of loosely coupled services; (ii) the service provided by the microservice is fine-grained; and (iii) the protocols of the microservice are lightweight.

Some other possible characteristics of microservices may include one, or more, of the following (herein collectively referred to as the "Twenty Possible Microservices Characteristics"): (i) services in a microservice architecture (MSA) are often processes that communicate over a network to fulfill a goal using technology-agnostic protocols (herein referred to as "network-communicative microservices"); (ii) microservices respectively provide services that are independently deployable (herein referred to as "independently deployable microservices"); (iii) the services are easy to replace (herein referred to as "easily replaceable microservices"); (iv) services are organized around capabilities (for example, user interface front-end, recommendation, logistics, billing, etc.) (herein referred to as "capability-centric microservices"); (v) services can be implemented using different programming languages, databases, hardware and software environment, depending on what fits best (herein referred to as "generically-implementable microservices"); (vi) messaging enabled; (vii) bounded by contexts; (viii) autonomously developed, (ix) decentralized; (x) built and released with automated processes (herein referred to as "automated microservices"); (xi) naturally enforces a modular structure; (xii) lends itself to a continuous delivery software development process; (xiii) a change to a small part of the application only requires rebuilding and redeploying only one or a small number of services; (xiv) adheres to principles of business-driven development (for example, domain-driven design); (xv) uses IDEAL cloud application architectures; (xvi) uses polyglot programming and persistence; (xvii) uses lightweight container deployment; (xviii) exhibits decentralized continuous delivery; (xix) uses DevOps with holistic service monitoring; and/or (xx) provides characteristics that are beneficial to scalability. Employing microservices enables the breaking down of complex applications into simpler independent processes.

Returning to the workflow 100 of FIG. 1, program code generates and/or updates the outlier detection model (120). To generate and/or update the outlier detection model, the program code generates a feature vector which includes feature attributes for each tuple (122). The program code maps each feature vector to a probability distribution based on solving a classification problem to construct the outlier detection model (124). The program code defines a range for feature attribute tuple combinations (126). The program code applies the outlier detection model to identify tuples within that comport with the feature range of tuples identified as having a high probability of generating production issues (130). The tuples are identified by the program code for application of the outlier detection model when the requests for the transactions are published en route to application programming interface (API) gateway adaptors. As applied by the program code, the outlier detection model utilizes a high performing pattern matching algorithm for tuples and feature vectors and publishes a response in microseconds. Once the program code has generated the (continuously updated) model, the program code applies the model, utilizing a real-time pattern-matching operation. In some embodiments, a hardware appliance performs the pattern matching to increase response time.

When the program code, by applying the model, identifies a transaction based on a tuple that comports with the feature range of tuples identified as having a high probability of generating production issues, the program code publishes a debug flag for the transaction to a distributed cache (140). As aforementioned, meta data of the request for the transaction includes a global transaction identifier, which is introduced by the API gateway. Thus, the program code publishes the transaction identifier for the flagged transaction. Thus, when a microservice or application executing in the technical environments processes the transaction, the microservice or application obtains the debug flag, and the microservice or application captures the debug trace. Based on obtaining the debug flag for the transaction from the distributed cache, a microservice or application processing the transaction captures a debug trace for the transaction while processing the transaction (150).

The program code also publishes the debug flag for the transaction to a topic (160). The topic, which can be referred to as a Kafka topic, is a category used to organize messages. The topic is unique across a (Kafka) cluster (of topics). In some examples, the program code publishes the debug flag and transaction identifier to a topic which is subscribed to by infrastructure as a service (IaaS) and/or platform as a service (PaaS) monitoring tools. Thus, upon publication to the topic, these monitoring tools can start capturing configured snapshots (depending on workload). If a request fails (meaning there was a failure in processing the transaction), the program code obtains the failure and provides transaction data and updates the outlier definition model for continuous learning to increase precision for outlier detection by the outlier definition model (170).

Figure 2:
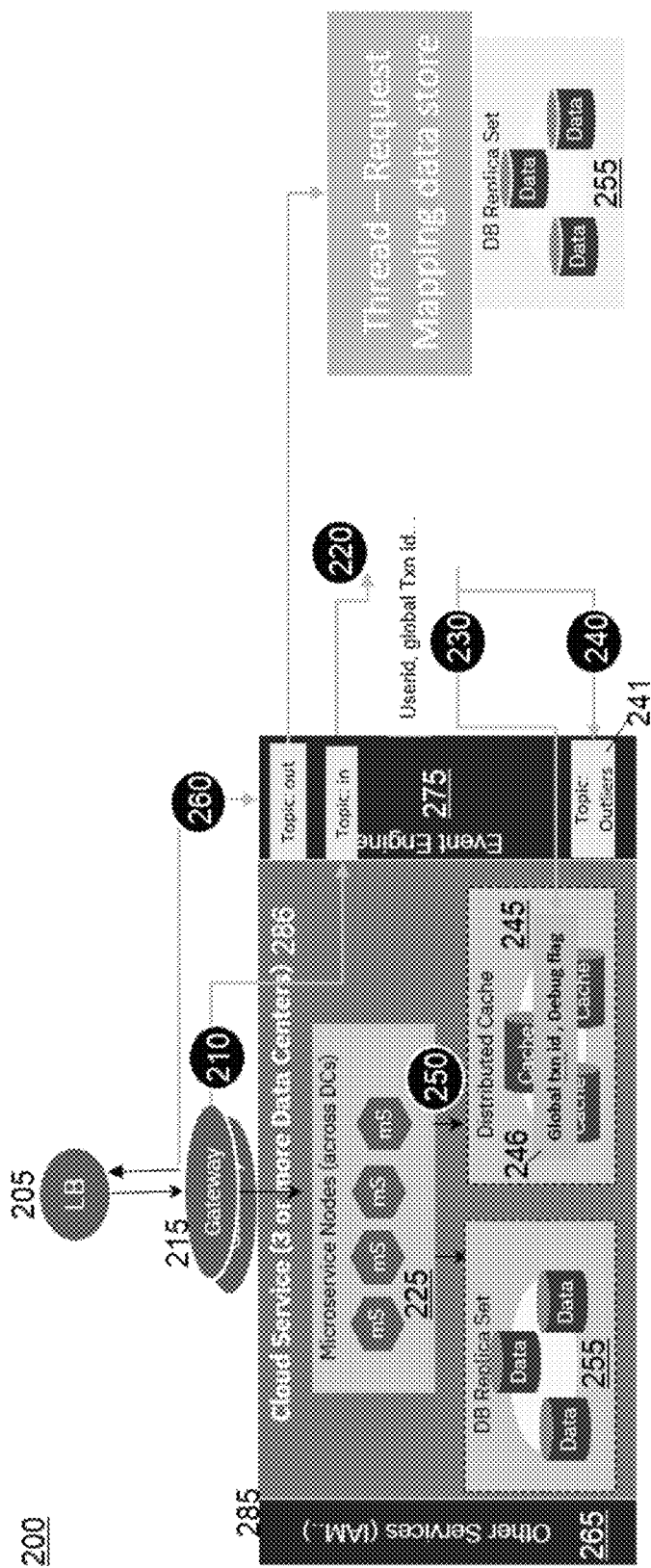
FIG. 2 depicts a technical environment into which aspects of some embodiments of the present invention have been implemented and a workflow comprising aspects of some embodiments of the present invention being executed in the technical environment.

FIG. 2 depicts a technical environment 200 in which various aspects of the workflow 100 of FIG. 1 can be implemented. The technical environment 200 of FIG. 2 includes a load balancer (LB) 205 and a gateway 215. In some examples, the gateway 215 is an API gateway and it is a BFF layer. Requests for transactions in the computing system 285 are received via the gateway 215. The computing system 285, in this example, which is offered for illustrative purposes only and not to suggest any limitations, is a cloud computing system that spans over one or more data centers (DCs). The specific example, which is non-limiting, comprises a cloud service 286 that is executed by computing resources at three or more physical DCs. The computing system 285 provides various applications to users as microservices, which are deployed to various microservice nodes 225 across the DCs. The microservice nodes 225 are communicatively coupled to one or more distributed caches 245. The microservice nodes 225 are also communicatively coupled to a set of databases 255, which replicate data utilized by various users accessing the microservices 225. The computing system also includes other services 265, in addition to the cloud service 286. The computing system 285 also includes an event engine 275.

FIG. 2 also illustrates how various aspects of the described computing methods are executed in the technical environment 200. As illustrated in FIG. 2, program code executing on one or more processing resources of the computing system 285 obtains, from a gateway 215, a request for one or more transactions to be processed by an application or service provided by one or more microservices available via the cloud service 286 on one or more microservice nodes 225 in a computing system 285. In this example, the program code obtains the request by publishing the request from the gateway 215 to an outlier detection model executing on one or more resources of the event engine 275 (210). The program code obtains the published request en route to BFF/adaptors of the gateway 215 from a load balancer 205. As explained earlier, a BFF server batches calls to backends, including the applications and/or microservices which will process the requested transactions. In some examples, the request for a transaction includes meta data, including a global transaction identifier, which the program code obtains from the gateway 210, as the gateway introduces this identifier. In some examples, the program code publishes the request asynchronously to the outlier detection model.

Program code applies the outlier detection model to the request and the program code publishes a response from the outlier detection model (220). Details published to the outlier detection model can include, but are not limited to, an identifier of a user who requested the transaction (i.e., userid), and a global transaction identifier for the requested transaction (i.e., global txn id). In some examples, the outlier detection model utilizes a high performing pattern matching algorithm (e.g., a real-time pattern matching operation) to determine whether the requested transaction comprises an outlier. The program code can apply this model and obtain a response within microseconds. However, in some examples, this response time can be improved to real-time or close to real-time by utilizing a programmed hardware appliance to apply the model to the request. If the program code determines that the transaction requested, based on the outlier detection model result, has a pre-defined probability or risk level of creating an issue when processed by a microservice or application executing on one or more resources of the computer system 285, the program code sets a debug flag for the incoming transaction identifier and the program code publishes the flag 246 to the distributed cache 245 (230). The program code can set the debug flag to either yes or no. Setting the flag to yes means that the debug trace will be engaged automatically by the program code, at the application level, when a microservice commences processing the transaction. If the flag is not set to no, the debug tracing will not be started by the program code when the microservice commences processing the transaction. The flag 246 includes the global transaction identifier and the debug flag.

One or more microservices executing on the microservice nodes 225 obtains transaction data from the distributed cache 245. Thus, when a microservice starts processing the requested transaction, the microservice obtains the debug flag 246 from the distributed cache 245. The program code automatically starts a debug trace at the application level if the debug flag 246 for the transaction is set to yes (250). Additionally, if the debug flag is set to yes, the program code publishes transaction details, which can include but are not limited to the global transaction identifier, to a topic (e.g., a Kafka topic) (240).

In some embodiments of the present invention, the topic to which the program code publishes the transaction identifier is one that is subscribed to by various monitoring tools of the computing system 285, including but not limited to IaaS and/or PaaS monitoring tools. The monitoring tools can start capturing configured snapshots. In some examples, whether or not the monitoring tools capture the snapshots is dependent on workloads. FIG. 2 depicts an "outliers" topic 241. The program code publishes the transaction details to this topic (240). Should the requested transaction fail, the program code provides this request failure to the outlier definition model for continuous learning and increased precision for outlier detection (260). FIG. 2 depicts the program code providing the failed request to a thread which can obtain transaction information from the database replica set 255 of the computing system 285 or from another computing system accessible to the program code.

Figure 3:
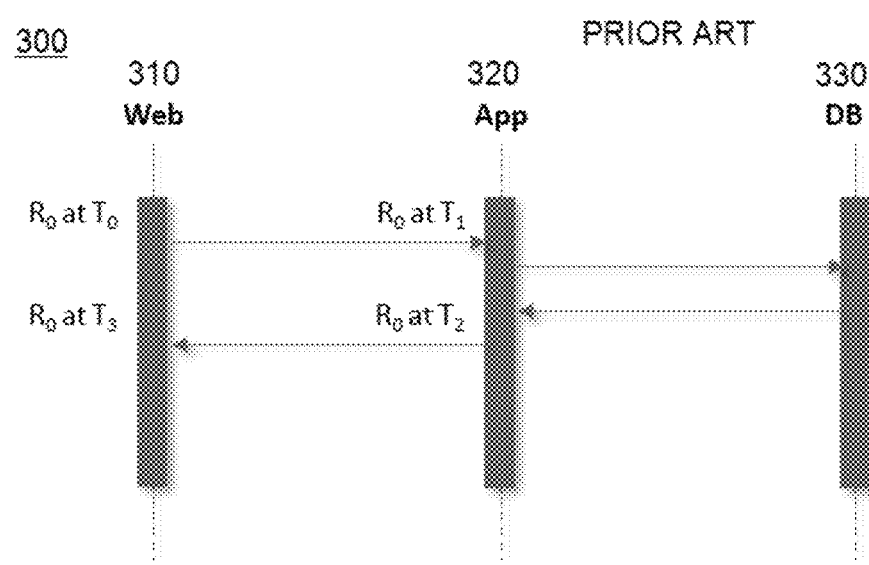
FIG. 3 depicts an example of an existing approach to debug tracing.

Before illustrating various aspects of the embodiments of the present invention in greater detail, including but not limited to, a flow process for each transaction, outlier detection, and machine learning to generate logic for the classification and matching which enable the outlier detection, FIGS. 3 and 4 illustrate differences between an existing tracing method 300 and certain aspects 400 of some embodiments of the present invention. These figures serve to illustrate certain significant advantages of the examples herein over existing methods of tracing transaction failures in a computing system.

In FIG. 3, which illustrates an existing method 300 for tracing debug tracing transactions within a computing system, debug tracing is performed for every requested transaction. As discussed above, the system overhead is increased with the approach and the data provided from the traces can be difficult to parse because so many users utilize the production environment that determining which logs are associated with a failed transaction can be time-consuming. However, in this approach, global tracing is turned on and all transactions are enumerated and sampled for a period of time, $T_a$ [Average response time]. Thus, in this approach:

---

If $(T_3 - T_0) > T_a$
{
Persist $R_0$ trace for subsequent analysis
}

---

As illustrated in FIG. 3, the trace of transaction, $R_0$, is continuous. A request for transaction $R_0$ is received from a web interface (e.g., gateway) 310 at time $T_0$ and proceeds to an application 320 for processing at time $T_1$. The application 320 processes the requested transaction, $R_0$, including accessing the database 330, and the trace of $R_0$ continues at $T_2$, when a result is returned to the application 320 from the database 330. The trace of $R_0$ continues as the transaction result is provided to the user, via the web interface 310. Whether or not the transaction $R_0$ fails, in this existing approach, the trace of $R_0$ is continuous.

FIG. 4 illustrates aspects 400 of some examples disclosed herein. As illustrated in FIGS. 1 and 2, the program code determines whether each request for a transaction in the computing system includes an outlier or not, based on applying an outlier detection model. In this example, $R_s$ is a requested standard transaction, meaning that there are no attributes of the transaction which the program code determines, based on applying the outlier detection model, are outliers. However, $R_0$ is a requested transaction in which certain attributes are outliers from the standard requested transaction, $R_s$. The program code does not turn on debug tracing when the requested transaction does not include outliers. Thus, $R_0$ is illustrated in FIG. 4 because when the program code, applying the model, detects outliers from the standard requested transaction, $R_s$, the program code turns on debug tracing. FIG. 4 illustrates an instance where the program code turns on debug tracing, thus, $R_0$ is illustrated, as opposed to $R_s$. The logic utilized in embodiments of the present invention to engage debug tracing appears below.

---

If $R_0$ attributes are outliers from $R_s$ {
setTraceOn($R_0$) = True
}
If toTrace($R_0$) {
Persist $R_0$ trace for subsequent analysis
}

---

As illustrated in FIG. 4, $R_0$ is received from a web interface (e.g., gateway) 410. The program code applies the outlier detection model 415 and determines that $R_0$ includes attributes that are outliers from $R_s$. Based on making this determination, the program code turns on debug tracing. The application 420 processes the requested transaction, $R_0$, including accessing the database 430, and the trace of $R_0$ continues when a result is returned to the application 420 from the database 430. The trace of $R_0$ continues as the transaction result is provided to the user, via the web interface 410. Thus, the trace persists through completion (or failure) of the requested transaction R0, to enable subsequent analysis of the transaction.

Figure 5:
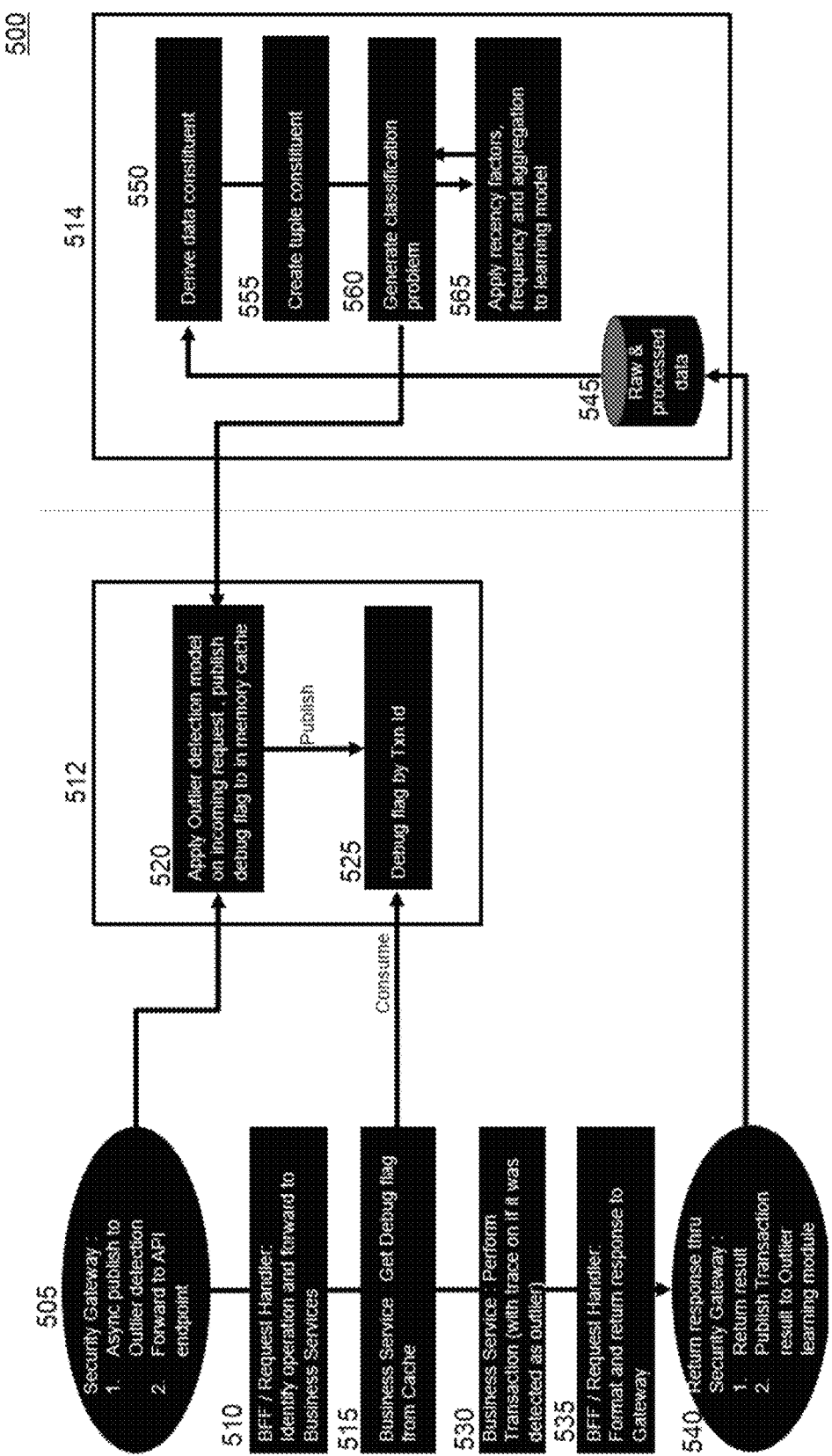
FIG. 5 depicts a workflow that includes various aspects of some embodiments of the present invention.

FIG. 5 illustrates a more detailed workflow 500 than those earlier in this document, which illustrates various aspects of some embodiments of the present invention. For ease of presentation, FIG. 5 highlights, visually, outlier detection 512, and the machine learning 514, which trains the model the program code utilizes for outlier detection 512. In this example, the outlier detection 512 is high performance outlier detection that computes (only) without input/output. In this example, the machine learning 514 is depicted as a batch flow for learning from historical data, which includes recent data.

In the workflow 500 of FIG. 5, the program code obtains a request for transaction via a gateway. The program code obtains the request at the security gateway and asynchronously publishes the request to an outlier detection model and forwards the request to an API endpoint (505). The program code also obtains a global transaction identifier for the transaction from the gateway via a BFF/request handler. The BFF/request handler identifies the transaction or operation, with a global transaction identifier (from the gateway) and forwards the identifier to business services executing in the computing environment in which the transaction will be processed (510). The BFF provides a frontend through which requests for transactions are batched to backend resources which process the transactions.

Moving to the outlier detection 512 portion of the workflow 500, the program code applies the outlier detection model to the incoming transaction request, and based on the outlier detection model returning to the program code that the transaction is an outlier from a standard transaction, the program code publishes the transaction to a distributed cache with a debug flag (520). To identify the transaction, the program code utilizes the global transaction identifier, which it consumes from the cache (525).

An application or microservice executing in the computing environment obtains the requested transaction for processing, and the program code determines, based on obtaining the debug flag from the cache, that the debug tracing should be turned on for processing of this transaction (515). If the outlier model had indicated that a requested transaction were not an outlier, the program code would not have set a debug flag to "yes" in the cache and thus, the program code would not turn on debug tracing for execution of the transaction. Thus, the application, referred to herein as a business service, processes the requested transaction (with the trace turned on if the outlier detection model, when applied by the program code, determined that the transaction included attributes that rendered in an outlier) (530). The BFF/request handler formats and returns a response to processing the transaction to the gateway (535). The program code saves the raw and processed transaction data (545), returns the response result via the gateway, including returning the response result to the requestor, and publishes the transaction to the machine learning process (540).

The program code learns from historical data including the most recent results (514). As part of this machine learning, the program code obtains the raw and processed transaction data and derives data constituents (550). This definition can be represented by Def(A). In a model utilized in some examples herein, a data set consists of 'd' training tuples, $\{t_1; t_2; \ldots; t_d\}$, and k numerical (real-valued) feature attributes, $A_1; \ldots A_k$. These training tuples with transaction attributes train the outlier detection model to detect requests for transactions with attributes outside of standard requested transactions. In this example, the type-cast constraint of attribute $A_j$ is $\mathsf{U}(A_j)$ and the frequency-constraint of attribute $A\omega=\lambda i^\wedge \in \Delta(\omega)\Delta\omega$. Thus, the frequency of a given attribute in a tuple is also relevant to determining whether a requested transaction includes outliers.

Relevant currency factors can include frequency and aggregates. As illustrated in FIG. 1, the program code derives data constituents aggregated to API tuples (110). The program code generates a tuple constituent (555). The tuple constituent can be represented as Def(B). Each tuple $t_i$ is associated with a feature vector $V_i$ and $V_i=(v_{i;1}; v_{i;2}; \ldots; v_{i;k})$, such that, a class label $c_i$, where $v_{i;j} \in \mathsf{U}(A_j)$ and $c_i \in C$, the set of all class labels. The API tuples include various attributes including attributes regarding the user channel, operation, transaction, location, and time. However, the feature vector $V_i$ is based on the tuple vector for the transaction, based on the transaction attributes. As discussed earlier, the outlier detection is based on transaction tuples. Based on the data constituent and tuple constituent, the program code generates a classification problem (560). The classification problem can be represented by Def(C). The classification problem is to construct a model M that maps each feature vector $(v_{x;1}; v_{x;2}; \ldots; v_{x;k})$ to a probability distribution $P_x$ on C such that given a test tuple $t_0=(v_{0;1}; \ldots; v_{0;k}; c_0)$, $P_0=M(v_{0;1}; \ldots; v_{0;k})$ predicts the class label $c_0$ with high accuracy. $P_0$ predicts $c_0$ if:

$$C_0 = \arg\max_{c \in C}(P_0[c])$$

A decision tree under an uncertainty model then resembles that of a point data model for which the program code recursively defines a contingent probability. Def(D) represents a probability constituent. The quantity $\varphi_n(c; t_x; w_x)$ can be interpreted as the conditional probability that $t_x$ has class label c, used to classify tuple $t_x$ with, weight $w_x$. For each node n, to determine $\varphi_n(c; t_x; w_x)$, the program code applying the model checks the attribute $A_{jn}$(from A.3) and median point $z_n$ of node 'n'. Since the probability density function (pdf) of $t_x$ under attribute $A_{jn}$ spans the interval $[a_{x;jn}; b_{x;jn}]$, the program code can compute a "left" probability:

$$p_L = \int a_{x;jn}^{zn} f_{x;jn}(t) dt$$

Where, $p_L=0$ in case $z_n < a_{x;jn}$ and, the program code can compute the "right" probability:

$$p_R = 1 - [\int a_{x;jn}^{zn} f_{x;jn}(t) dt]_{z_x \geq a_{x;jn}}$$

The program code can split $t_x$ (from Def(A,1), Def(D.11, D.12, D.13)) into two fractional tuples $t_L$ and $t_R$ as illustrated below:

$$f_{L;jn}(x) = \begin{cases} f_{x;jn}(x)/w_L & \text{if } x \in [a_{x;jn}; z_x] \\ 0 & \text{otherwise} \end{cases}$$

Where, Tuple $t_L$ is assigned a weight of $w_L=w_x \cdot P_L$; $f_{L;jn}(X)$ is pdf for $A_{jn}$ $f_{L;jn}(x)$ provides the detection parity for non-compliance of the range bound values.

The program code applies recency factors, frequency, and aggregation into a learning model (565). Thus, the program code can apply a most recent (updated) outlier detection model to incoming transaction requests (520).

Embodiments of the present invention include a computer-implemented method, a computer program product, and a computing systems where program code executing on one or more processors obtains, via a gateway, a request for a transaction to be processed in a/the computing system by an application executing on one or more computing resources of the computing system, where a debug trace for transactions processed by the computing system is turned off by default. The program code applies to the request for the transaction, an outlier detection model, to determine whether the transaction comprises attributes matching transaction tuples of one or more historical transactions identified as triggering issues in the computing system when the application processed the historical transactions. The program code classifies the transaction as being an outlier transaction or as being a standard transaction, based on applying the outlier detection model. Based on determining that the transaction is an outlier transaction, concurrently with the application processing the transaction, the program code turns on the debug trace to debug trace the application processing of the transaction.

In some examples, the application comprises one or more microservices.

In some examples, the program code obtaining the request comprises the program code obtaining a request published by the gateway, where the request comprises a global transaction identifier.

In some examples, the program code classifies the transaction by setting a debug flag for the transaction in a distributed cache in the computing system when classifying the transaction as the outlier transaction.

In some examples, the program code setting the debug flag comprises the program code updating or generating a record for the transaction in the distributed cache, the record comprising the debug flag and the global transaction identifier.

In some examples, the program code turning on the debug trace to debug trace the application processing of the transaction is based on the application obtaining the debug flag from the distributed cache.

In some examples, the program code obtains a result of the transaction, where the result of the transaction is a failure. The program code publishes the details of the transaction to a topic, where the topic is subscribed to by a monitoring tool of the computing system.

In some examples, the program code retains raw data and processed data associated with the transaction. The program code utilizes the raw data and the processed data to train the outlier detection model.

In some examples, the program code generates the outlier detection model by: obtaining raw data and processed data associated with one or more past transactions processed by one or more resources of the computing system, where each of the one or more past transactions generated an issue during processing. For each past transaction of the one or more past transactions the program code generates a feature vector comprising feature attributes for each tuple comprising each past transaction to determine feature-tuple combinations for the past transaction. The program code maps the feature vector to a probability distribution, based on solving a classification problem. The program code defines a range for each feature attribute-tuple combination.

In some examples, the program code classifies the transaction as being an outlier transaction or as being a standard transaction. The program code determines if tuples comprising the transaction comport with the range for each feature attribute-tuple combination of the one or more past transactions. Based on determining that the tuples comport with the range, the program code classifies the transaction as an outlier.

In some examples, the program code obtains a result of the transaction. Based on obtaining the result, the program code turns off the debug trace.

In some examples, the gateway comprises an application programming interface gateway.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, elements of the computing system 285, can comprise one or more cloud computing node 10 (FIG. 6) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
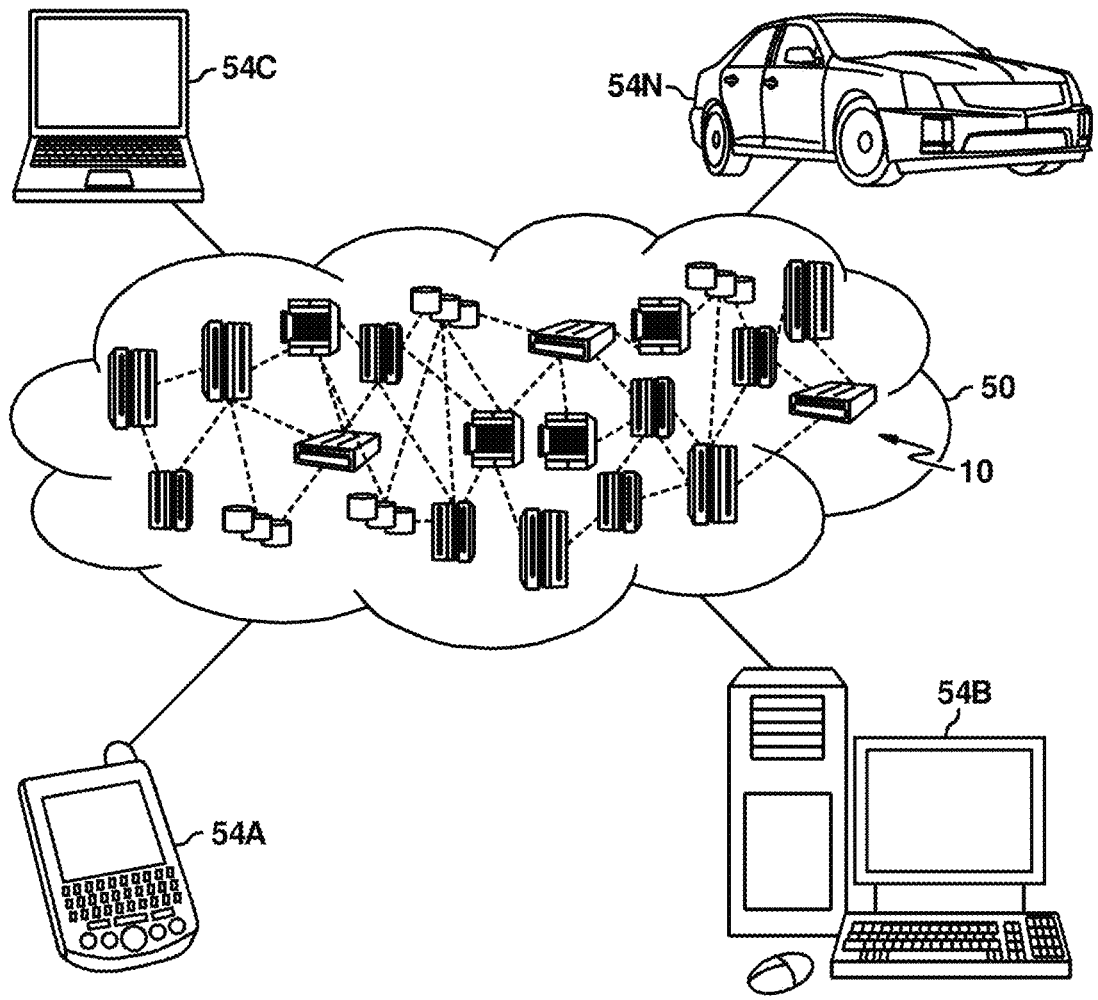
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
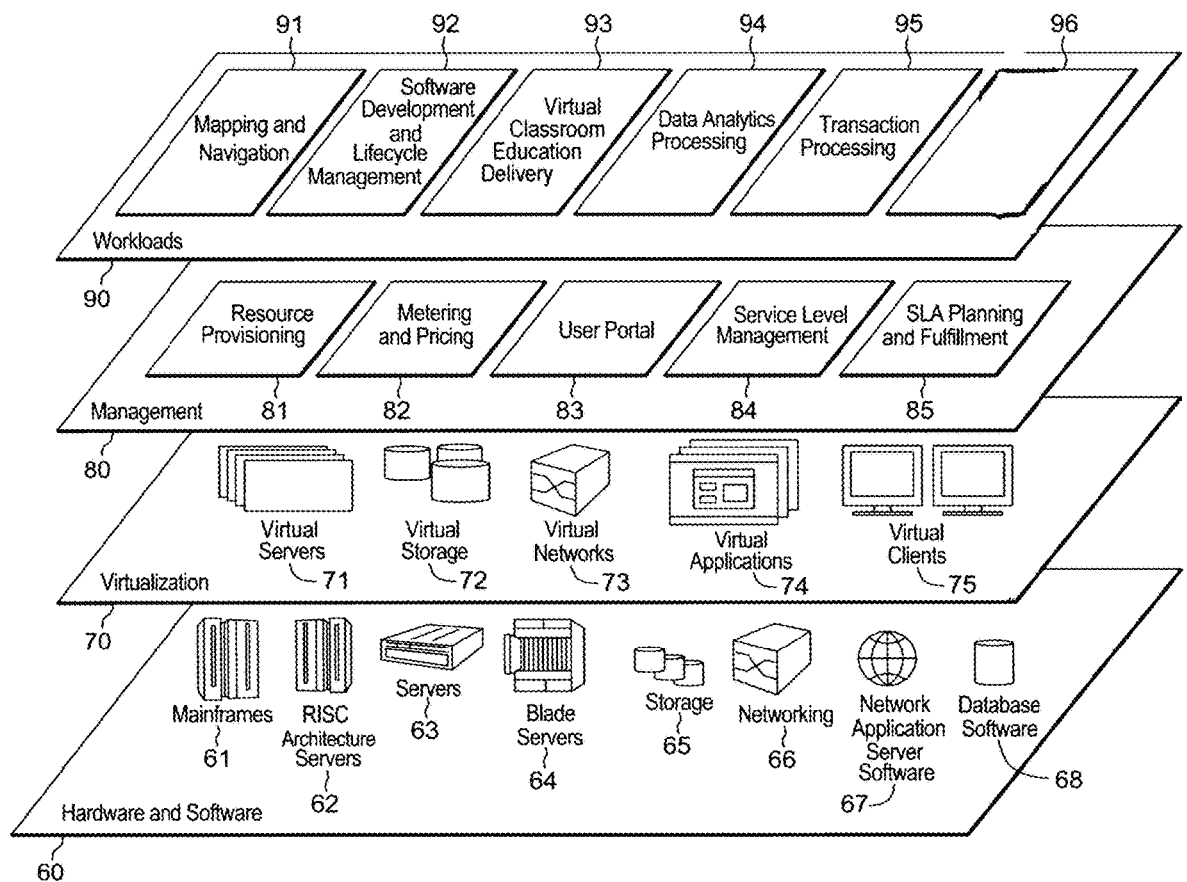
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. Workloads can also include virtual examination centers or online examinations (not pictured).

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamically controlling debug trace functionality within a computing environment 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    obtaining, by one or more processors, via a gateway, a request for a transaction to be processed in a production environment of a computing system by an application executing on one or more computing resources of the computing system, wherein a debug trace for transactions processed in the production environment by the computing system is turned off by default;
    applying, by the one or more processors, to the request for the transaction, an outlier detection model, to determine whether the transaction comprises attributes matching transaction tuples of one or more historical transactions identified as triggering issues in the computing system when the application processed the historical transactions;
    classifying, by the one or more processors, the transaction as being an outlier transaction or as being a standard transaction, based on applying the outlier detection model;
    based on the classifying, publishing, by the one or more processors, a debug flag associated with the transaction to a distributed cache; and
    based on determining that the transaction is an outlier transaction, concurrently with the application processing the transaction when executed in the production environment of the computing system, turning on, by the one or more processors, the debug trace to debug trace the application processing of the transaction, wherein turning on the debug trace to debug trace the application processing of the transaction is based on the application obtaining the debug flag from the distributed cache.

2. The computer-implemented method of claim 1, wherein the application comprises one or more microservices.

3. The computer-implemented method of claim 1, wherein obtaining the request comprises obtaining a request published by the gateway, wherein the request comprises a global transaction identifier.

4. The computer-implemented method of claim 3, wherein publishing the debug flag associated with the transaction comprises updating or generating a record for the transaction in the distributed cache, the record comprising the debug flag and the global transaction identifier.

5. The computer-implemented method of claim 1, further comprising:
    obtaining, by the one or more processors, a result of the transaction, wherein the result of the transaction is a failure; and
    publishing, by the one or more processors, the details of the transaction to a topic, wherein the topic is subscribed to by a monitoring tool of the computing system.

6. The computer-implemented method of claim 1, further comprising:
    retaining, by the one or more processors, raw data and processed data associated with the transaction; and
    utilizing, by the one or more processors, the raw data and the processed data to train the outlier detection model.

7. The computer-implemented method of claim 1, further comprising:
    generating, by the one or more processors, the outlier detection model, the generating comprising:
        obtaining, by the one or more processors, raw data and processed data associated with one or more past transactions processed by one or more resources of the computing system, wherein each of the one or more past transactions generated an issue during processing, and for each past transaction of the one or more past transactions:
            generating, by the one or more processors, a feature vector comprising feature attributes for each tuple comprising each past transaction to determine feature-tuple combinations for the past transaction;
            mapping, by the one or more processors, the feature vector to a probability distribution, based on solving a classification problem; and
            defining, by the one or more processors, a range for each feature attribute-tuple combination.

8. The computer-implemented method of claim 7, wherein classifying the transaction as being an outlier transaction or as being a standard transaction comprises:
    determining, by the one or more processors, if tuples comprising the transaction comport with the range for each feature attribute-tuple combination of the one or more past transactions; and
    based on determining that the tuples comport with the range, classifying, by the one or more processors, the transaction as an outlier.

9. The computer-implemented method of claim 1, further comprising:
obtaining, by the one or more processors, a result of the transaction; and
based on obtaining the result, turning off, by the one or more processors, the debug trace.

10. The computer-implemented method of claim 1, wherein the gateway comprises an application programming interface gateway.

11. A computer program product comprising:
a computer readable storage medium readable by one or more processors of a shared computing environment comprising a computing system and storing instructions for execution by the one or more processors for performing a method comprising:
obtaining, by the one or more processors, via a gateway, a request for a transaction to be processed in a production environment of a computing system by an application executing on one or more computing resources of the computing system, wherein a debug trace for transactions processed in the production environment by the computing system is turned off by default;
applying, by the one or more processors, to the request for the transaction, an outlier detection model, to determine whether the transaction comprises attributes matching transaction tuples of one or more historical transactions identified as triggering issues in the computing system when the application processed the historical transactions;
classifying, by the one or more processors, the transaction as being an outlier transaction or as being a standard transaction, based on applying the outlier detection model;
based on the classifying, publishing, by the one or more processors, a debug flag associated with the transaction to a distributed cache; and
based on determining that the transaction is an outlier transaction, concurrently with the application processing the transaction when executed in the production environment of the computing system, turning on, by the one or more processors, the debug trace to debug trace the application processing of the transaction, wherein turning on the debug trace to debug trace the application processing of the transaction is based on the application obtaining the debug flag from the distributed cache.

12. The computer program product of claim 11, wherein the application comprises one or more microservices.

13. The computer program product of claim 11, wherein obtaining the request comprises obtaining a request published by the gateway, wherein the request comprises a global transaction identifier.

14. The computer program product of claim 13, wherein publishing the debug flag associated with the transaction comprises updating or generating a record for the transaction in the distributed cache, the record comprising the debug flag and the global transaction identifier.

15. The computer program product of claim 11, further comprising:
obtaining, by the one or more processors, a result of the transaction, wherein the result of the transaction is a failure; and
publishing, by the one or more processors, the details of the transaction to a topic, wherein the topic is subscribed to by a monitoring tool of the computing system.

16. A computer system comprising:
a memory;
one or more processors in communication with the memory;
program instructions executable by the one or more processors to perform a method, the method comprising:
obtaining, by the one or more processors, via a gateway, a request for a transaction to be processed in a production environment of a computing system by an application executing on one or more computing resources of the computing system, wherein a debug trace for transactions processed in the production environment by the computing system is turned off by default;
applying, by the one or more processors, to the request for the transaction, an outlier detection model, to determine whether the transaction comprises attributes matching transaction tuples of one or more historical transactions identified as triggering issues in the computing system when the application processed the historical transactions;
classifying, by the one or more processors, the transaction as being an outlier transaction or as being a standard transaction, based on applying the outlier detection model;
based on the classifying, publishing, by the one or more processors, a debug flag associated with the transaction to a distributed cache; and
based on determining that the transaction is an outlier transaction, concurrently with the application processing the transaction when executed in the production environment of the computing system, turning on, by the one or more processors, the debug trace to debug trace the application processing of the transaction, wherein turning on the debug trace to debug trace the application processing of the transaction is based on the application obtaining the debug flag from the distributed cache.

* * * * *